US009482166B2

(12) United States Patent
Richardson et al.

(10) Patent No.: US 9,482,166 B2
(45) Date of Patent: Nov. 1, 2016

(54) METHOD OF CONTROLLING A DIRECT-INJECTION GASEOUS-FUELLED INTERNAL COMBUSTION ENGINE SYSTEM WITH A SELECTIVE CATALYTIC REDUCTION CONVERTER

(71) Applicant: Westport Power Inc., Vancouver (CA)

(72) Inventors: Sean D. Richardson, Vancouver (CA); Olivier P. M. Lebastard, Delta (CA)

(73) Assignee: WESTPORT POWER INC., Vancouver (CA)

( * ) Notice: Subject to any disclaimer, the term of this patent is extended or adjusted under 35 U.S.C. 154(b) by 183 days.

(21) Appl. No.: 13/633,070

(22) Filed: Oct. 1, 2012

(65) Prior Publication Data
US 2013/0019588 A1    Jan. 24, 2013

Related U.S. Application Data

(63) Continuation of application No. PCT/CA2011/000442, filed on Apr. 15, 2011.

(30) Foreign Application Priority Data

Apr. 20, 2010  (CA) .................................... 2698342
May 7, 2010   (CA) .................................... 2702246

(51) Int. Cl.
*F01N 3/18*      (2006.01)
*F02M 26/05*   (2016.01)
(Continued)

(52) U.S. Cl.
CPC ........... *F02D 41/0027* (2013.01); *F01N 3/106* (2013.01); *F01N 3/208* (2013.01);
(Continued)

(58) Field of Classification Search
USPC .......... 60/274, 286, 295, 297; 123/515, 525, 123/575
See application file for complete search history.

(56) References Cited

U.S. PATENT DOCUMENTS

| 4,259,934 | A | * | 4/1981 | Leussink et al. ........ 123/406.59 |
| 5,549,083 | A | | 8/1996 | Feuling |

(Continued)

FOREIGN PATENT DOCUMENTS

| CA | 2406137 A | 1/2003 |
| CN | 1274407 A | 11/2000 |

(Continued)

OTHER PUBLICATIONS

Machine Translation DE 102006020223 B3.*
(Continued)

*Primary Examiner* — Thomas Denion
*Assistant Examiner* — Brandon Lee
(74) *Attorney, Agent, or Firm* — Carie Mager

(57) ABSTRACT

A method controls a direct-injection gaseous-fuelled internal combustion engine system to improve the conversion efficiency of an SCR converter that is operative to reduce levels of NOx. The method comprises detecting when the internal combustion engine is idling and timing the injection of a first quantity of fuel to begin injection when the engine's piston is near top dead center; and controlling the temperature of exhaust gas to be above a predetermined temperature that is defined by an operating temperature range that achieves a desired conversion efficiency for the selective catalytic reduction converter, by: (a) timing injection of the gaseous fuel to begin after timing for injection the first quantity of fuel, and (b) increasing exhaust gas temperature by increasing a delay in timing for injecting the gaseous fuel, while limiting the delay to keep concentration of unburned fuel exiting the combustion chamber below a predetermined concentration.

28 Claims, 3 Drawing Sheets

(51) Int. Cl.
*F02D 41/00* (2006.01)
*F01N 3/10* (2006.01)
*F01N 3/20* (2006.01)
*F02D 19/10* (2006.01)
*F02D 41/02* (2006.01)
*F02D 19/06* (2006.01)
*F02D 19/08* (2006.01)
*F02M 21/02* (2006.01)
*F02D 19/02* (2006.01)
*F01N 13/00* (2010.01)
*F02D 41/08* (2006.01)
*F02D 41/40* (2006.01)
*F02B 37/00* (2006.01)
*F02D 41/14* (2006.01)
*F02D 41/38* (2006.01)

(52) U.S. Cl.
CPC ....... *F01N 13/009* (2014.06); *F01N 13/0097* (2014.06); *F02D 19/024* (2013.01); *F02D 19/061* (2013.01); *F02D 19/0689* (2013.01); *F02D 19/081* (2013.01); *F02D 19/10* (2013.01); *F02D 41/0025* (2013.01); *F02D 41/0245* (2013.01); *F02D 41/08* (2013.01); *F02D 41/402* (2013.01); *F02D 41/403* (2013.01); *F02M 21/0275* (2013.01); *F02M 26/05* (2016.02); *F01N 2430/08* (2013.01); *F01N 2900/08* (2013.01); *F01N 2900/1404* (2013.01); *F01N 2900/1621* (2013.01); *F02B 37/00* (2013.01); *F02D 41/0275* (2013.01); *F02D 41/1446* (2013.01); *F02D 2041/389* (2013.01); *Y02T 10/24* (2013.01); *Y02T 10/26* (2013.01); *Y02T 10/32* (2013.01); *Y02T 10/36* (2013.01); *Y02T 10/44* (2013.01)

(56) References Cited

U.S. PATENT DOCUMENTS

| | | | |
|---|---|---|---|
| 5,768,888 A * | 6/1998 | Matros et al. | 60/274 |
| 5,826,425 A | 10/1998 | Sebastiano et al. | |
| 6,209,313 B1 * | 4/2001 | Wissler et al. | 60/274 |
| 6,345,499 B1 | 2/2002 | Nishimura et al. | |
| 6,491,016 B1 | 12/2002 | Buratti | |
| 6,591,818 B2 | 7/2003 | Sasaki et al. | |
| 6,622,480 B2 | 9/2003 | Tashiro et al. | |
| 6,666,020 B2 | 12/2003 | Tonetti et al. | |
| 6,901,747 B2 | 6/2005 | Tashiro et al. | |
| 6,948,476 B2 | 9/2005 | Gioannini et al. | |
| 7,051,701 B2 | 5/2006 | Tomita | |
| 7,073,479 B2 | 7/2006 | Kohler et al. | |
| 7,140,345 B2 | 11/2006 | Gioannini et al. | |
| 7,204,228 B2 | 4/2007 | Oechsle et al. | |
| 7,254,941 B2 | 8/2007 | Okugawa et al. | |
| 7,373,931 B2 * | 5/2008 | Lennox et al. | 123/525 |
| 2005/0022506 A1 * | 2/2005 | Nishizawa et al. | 60/276 |
| 2006/0185351 A1 | 8/2006 | Eves et al. | |
| 2006/0260585 A1 | 11/2006 | Munshi et al. | |
| 2008/0141988 A1 | 6/2008 | Jeon | |
| 2008/0264036 A1 * | 10/2008 | Bellovary | F01N 3/00 60/274 |
| 2008/0295499 A1 * | 12/2008 | Driscoll et al. | 60/288 |
| 2009/0266055 A1 | 10/2009 | Guo et al. | |

FOREIGN PATENT DOCUMENTS

| | | | | |
|---|---|---|---|---|
| CN | 1667255 A | | 9/2005 | |
| CN | 1871414 A | | 11/2006 | |
| DE | 102006020223 | | 2/2007 | |
| DE | 102006020223 B3 * | | 8/2007 | F02M 45/08 |
| EP | 1748163 A1 | | 1/2007 | |
| JP | 2000320440 A | | 11/2000 | |

OTHER PUBLICATIONS

International Search Report and Written Opinion of the International Searching Authority issued on Aug. 2, 2011, in connection with International Application No. PCT/CA2011/000442.

International Preliminary Report on Patentability issued on Oct. 23, 2012, in connection with International Application No. PCT/CA2011/000442.

Official action issued on Sep. 28, 2010, in connection with Canadian Patent Application No. 2,702,246.

* cited by examiner

METHOD OF CONTROLLING A DIRECT-INJECTION GASEOUS-FUELLED INTERNAL COMBUSTION ENGINE SYSTEM WITH A SELECTIVE CATALYTIC REDUCTION CONVERTER

CROSS-REFERENCE TO RELATED APPLICATION(S)

This application is a continuation of International Application No. PCT/CA2011/000442, having an international filing date of Apr. 15, 2011, entitled "Method Of Controlling A Direct-Injection Gaseous-Fuelled Internal Combustion Engine System With A Selective Catalytic Reduction Converter". The '442 international application claimed priority benefits, in turn, from Canadian Patent Application No. 2,698,342 filed on Apr. 20, 2010, and from Canadian Patent Application No. 2,702,246 filed on May 7, 2010, each of which is hereby incorporated by reference herein in its entirety.

FIELD OF THE INVENTION

The present invention relates to a method of controlling a direct-injection gaseous-fuelled internal combustion engine system with a selective catalytic reduction converter to reduce emissions of NOx when the engine is idling.

BACKGROUND OF THE INVENTION

Presently, most over-the-road heavy vehicles are fuelled by gasoline or diesel fuel. Because both gasoline and diesel-fuelled internal combustion engines generate a significant amount of pollutants such as oxides of nitrogen (NOx) and particulate matter (PM), engine manufacturers have been searching for best ways to improve their engines to comply with the new government regulatory standards which are becoming progressively more stringent with respect to the allowed levels of pollutants in tailpipe emissions.

For diesel-cycle engines one approach that shows a significant improvement in reducing the levels of pollutants in tailpipe emissions involves substituting a part or all the diesel fuel with cleaner burning gaseous fuels such as natural gas, pure methane, ethane, liquefied petroleum gas, lighter flammable hydrocarbon derivatives, hydrogen, and blends of such fuels. Gaseous fuels are generally defined herein as fuels that are gaseous at atmospheric pressure and zero degrees Celsius. Whereas liquid fuels such as diesel are injected at very high pressures in order to atomize the fuel, gaseous fuels can be injected into an engine's combustion chamber at lower pressures because no extra energy is required for fuel atomization. An advantage of using the diesel-cycle and substituting a gaseous fuel for diesel fuel is this approach can preserve the high efficiency and high torque of the conventional diesel engines, while reducing pollutant levels in tailpipe emissions.

However, some modifications are required to a conventional diesel engine to allow gaseous fuels to be substituted for diesel fuel. In a conventional diesel engine, the heat produced by the mechanical compression of the fuel and air mixture auto-ignites the liquid diesel fuel charge at or near the end of the piston's compression stroke. Other liquid fuels such as dimethyl ether, bio-diesel, and kerosene will also auto-ignite at the temperatures and pressures within the combustion chamber generated by the compression of the charge within the combustion chamber. However, under the same temperature and pressure conditions generated by the compression of the charge within the combustion chamber, gaseous fuels such as natural gas will not reliably auto-ignite. Therefore, in order to reliably burn a gaseous fuel in a conventional compression ignition engine with the same compression ratio as a diesel engine, an igniter is required within the combustion chamber to assist with ignition of the gaseous fuel, such as a hot surface provided by a glow plug, a spark plug, or a fuel injection valve for introducing a fuel that will reliably auto-ignite, acting as a pilot fuel. The pilot fuel can be a small quantity of diesel fuel, whereby the auto-ignition of the diesel fuel triggers the ignition of gaseous fuel.

While gaseous fuels are generally cleaner burning than conventional liquid fuels, tailpipe emissions from gaseous-fuelled engines can be further improved to reduce the levels of NOx by applying a treatment called Selective Catalytic Reduction ("SCR") to the gases exhausted from the engine. In an SCR converter, ammonia is injected into the exhaust stream upstream of the SCR catalyst as a reduction agent. The ability of ammonia as a reductant to achieve a significant reduction of NOx has been proven for stationary power applications and therefore has been used in diesel-fuelled engines. Other forms of ammonia can be used, such as urea, aqueous, gaseous or liquid ammonia. Using an SCR converter, the SCR catalyst facilitates the reaction between ammonia and NOx to produce water and nitrogen gas.

However, the applicants have found that combining an SCR converter with a gaseous-fuelled engine did not always achieve the same NOx conversion rates. Under some conditions, especially when the engine is idling, it was found that the temperature of the exhaust gas exiting the combustion chamber was significantly lower than the temperatures normally found under higher speed engine operation. To maintain a high NOx conversion rate it was determined that the temperature of the catalytic bed in the SCR converter is preferably above a predetermined temperature which can vary depending upon the composition of the catalyst. Generally, if the temperature of the exhaust gas exiting the combustion chamber is maintained above 200 degrees Celsius, acceptable NOx conversion rates are achieved.

For conventional diesel engines there are many known approaches for increasing the exhaust gas temperature, but there are particular characteristics of gaseous-fuelled engines that prevent the simple transfer of these approaches. For example, some approaches result in unburned fuel being introduced into the exhaust stream, and gaseous fuels, such as natural gas, which consists mostly of light hydrocarbons (methane in particular), do not readily oxidize in the diesel oxidation catalyst of the after-treatment system, especially at lower temperatures, and therefore do not generate heat to be used by the aftertreatment system.

Therefore there are special considerations that need to be taken into account to develop a successful engine system that uses a gaseous fuel and a SCR converter for reducing levels of NOx in the tailpipe emissions.

BRIEF SUMMARY OF THE INVENTION

A control method is provided for an internal combustion engine comprising a combustion chamber defined by a cylinder and a piston reciprocable within the cylinder, the piston being connected to a crankshaft that rotates when the piston reciprocates, and an injector for injecting a gaseous fuel directly into the combustion chamber. The exhaust gas exiting from the combustion chamber is received in a selective catalyst reduction (SCR) converter that is operative to reduce levels of NOx in the exhaust gas by converting NOx into nitrogen and water.

The method comprises the steps of detecting at least one engine parameter indicative of when the internal combustion engine is idling and, in an engine cycle, when determining that the internal combustion engine is idling timing the injection of a first quantity of fuel to begin injection when the piston is near top dead center and controlling temperature of exhaust gas exiting the combustion chamber to be above a predetermined temperature that is defined by an operating temperature range that achieves a desired conversion efficiency for the selective catalytic reduction converter. The temperature of the exhaust gas is controlled by timing the beginning of injection of the gaseous fuel to be after the injection the first quantity of fuel, and increasing exhaust gas temperature by increasing a delay in timing for injecting the gaseous fuel, while limiting the delay to keep the concentration of unburned fuel exiting the combustion chamber below a predetermined concentration.

One parameter indicative of when the engine is idling can be the engine's speed. Another parameter indicative of when the engine is idling can be a total fuelling amount. Also, a controller could read the values of both these parameters from a two-axis map to determine when the engine is idling.

In some embodiments of the present method, the fuel injector injects the first quantity of fuel in a plurality of pulses introduced sequentially into the combustion chamber. Each one of the pulses can have the same duration, or they can be different in duration.

If a controller determines from at least one engine parameter, for example the engine speed or total fuelling amount, that the engine has transitioned from idling to load, it gradually advances both timing for beginning injection of the first quantity of fuel and timing for beginning injection of the gaseous fuel until each begins before the piston is at top dead center with each timing predetermined based on engine speed and respective commanded quantities of fuel based on total fuel energy required by engine load.

If the first quantity of fuel is injected into the combustion chamber in a plurality of pulses and the controller determines that the engine has transitioned from idling to load, it gradually advances both timing for beginning injection of each one of the plurality of pulses and timing for beginning injection of the gaseous fuel, and decreasing elapsed time between the plurality of pulses, until the plurality of pulses has merged into a single pulse and until the timing for beginning injection of the first quantity of fuel and the gaseous fuel is advanced to occur before the piston is at top dead center and the injection timings are predetermined based on engine speed and respective commanded quantities of fuel based on total fuel energy required by engine load.

In a preferred embodiment, when determining from the engine speed and total fuelling amount that the engine is idling, the method comprises the step of timing an injection of a first quantity of fuel in two pulses to begin injection of a first pulse when the piston is near top dead center and to begin injection of a second pulse after ending the injection of the first pulse. The controller controls the temperature of exhaust gas exiting the combustion chamber to be above a predetermined temperature that is defined by an operating temperature range that achieves a desired conversion efficiency for the selective catalytic reduction converter by timing beginning of an injection of the gaseous fuel directly into the combustion chamber to be after timing for injection of the two pulses, and increasing exhaust gas temperature by increasing a delay in timing for injecting the gaseous fuel, while limiting the delay to keep concentration of unburned fuel exiting the combustion chamber below a predetermined concentration. The controller adjusts the timing for beginning injection of the second pulse to be generally near beginning of the gaseous fuel injection. The second pulse can have the same duration as the first pulse or they can be different in duration.

When the first quantity of fuel is injected in two pulses and the controller determines from the engine speed and total fuelling amount that the engine has transitioned from idling to load, it gradually advances both timing for beginning injection of each one of two pulses and timing for beginning injection of the gaseous fuel, decreases elapsed time between the end of the first pulse and the beginning of the gaseous fuel injection and decreases the amount of fuel injected in the second pulse, until a single pulse is injected into the combustion chamber and until the timing for beginning injection of the single pulse and the gaseous fuel is before the piston is at top dead center with each timing predetermined based on engine speed and respective commanded quantities of fuel based on total fuel energy required by engine load.

In preferred embodiments, for example for a 15 liter direct-injection natural gas internal combustion engine ignited by a diesel fuel, the delay in timing for injecting the gaseous fuel, measured in degrees of crank angle rotation can be between 14 and 25 degrees after top dead center. In such embodiments the controller can end injection of the first quantity of fuel at a timing when the crankshaft angle of rotation is within 1 degree before or after of beginning the injection of the natural gas so that the ignition of the diesel fuel can warm up the combustion chamber and thereby transfer the heat to the natural gas injected into the combustion chamber after the diesel. The beginning of the injection of the first quantity of fuel can start when the crankshaft is positioned between 2 crank angle degrees before top dead center and 5 crank angle degrees after top dead center.

For many engines, the predetermined concentration of unburned fuel exiting the combustion chamber that is acceptable for an efficient operation of the selective catalytic reduction converter is 1000 ppm. In preferred embodiments the concentration of unburned fuel in the exhaust can be below between 200 and 300 ppm.

Since selective catalytic reduction converters require a temperature of at least 200 degrees Celsius to operate efficiently, the predetermined temperature of the exhaust gas exiting the combustion chamber according to the present method is generally equal to or higher than 200 degrees Celsius.

The gaseous fuel injected directly into the combustion chamber is selected from the group consisting of natural gas, methane, propane, butane, hydrogen, and mixtures thereof.

When the first quantity of fuel injected into the combustion chamber is a fuel that is the same as the gaseous fuel, the internal combustion engine comprises an igniter disposed within the combustion chamber for igniting the fuel, for example a glow plug, a spark plug or a hot surface.

In other embodiments, the first quantity of fuel injected into the combustion chamber is a fuel that auto-ignites in the combustion chamber, for example a fuel selected from the group consisting of diesel fuel, dimethylether, bio-diesel, and kerosene.

DETAILED DESCRIPTION OF PREFERRED EMBODIMENT(S)

Figure 1:
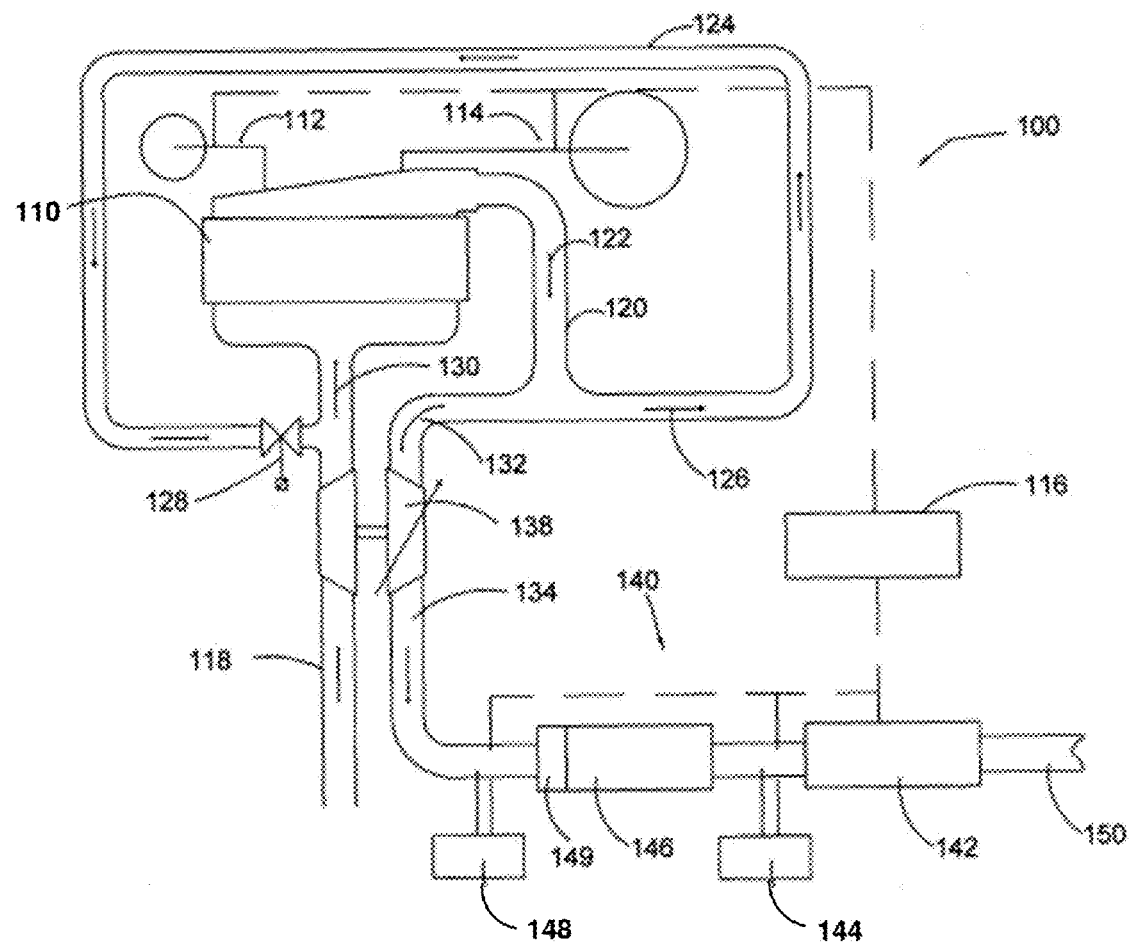
FIG. 1 is a schematic view of a direct-injection gaseous-fuelled internal combustion engine system comprising an exhaust after-treatment subsystem and an exhaust gas recirculation loop.

FIG. 1 shows a schematic view of a direct-injection gaseous-fuelled internal combustion engine system comprising an exhaust after-treatment subsystem and an exhaust gas recirculation loop. Herein "direct-injection" is used to refer to the injection of fuel directly into the combustion chamber of an internal combustion engine, which is an approach that is technically distinct from engines that inject fuel into an engine's intake manifold or into the intake ports on the manifold side of the engine's intake valves. With direct-injection engines the fuel can be injected later in the engine cycle, thereby avoiding fuelling and compression ratio limitations associated with avoiding engine knock ("pre-mature detonation of the fuel"). Conversely, this generally allows direct-injection engines to employ higher compression ratios, and achieve higher efficiencies and power outputs compared to other engines with the same displacement. The disclosed method can be used with engines that inject gaseous fuel directly into the combustion chamber through an injector. The gaseous fuel can be ignited by an ignition means which can be a spark plug, a glow plug, a hot surface or a pilot fuel that auto-ignites inside the combustion chamber. When gaseous fuel ignition is assisted by a pilot fuel, the pilot fuel is preferably introduced directly into the combustion chamber by a separate injector. In some embodiments the gaseous fuel injector and the pilot fuel injector are integrated into a single assembly, but with separate passages for the gaseous and pilot fuels so that the two injectors are independently operable to separately inject each fuel at different times. The schematic view shown in FIG. 1 is not to scale, with some parts shown larger relative to the other parts to better illustrate their function. The disclosed direct-injection internal combustion engine has at least one cylinder, a piston being reciprocable within the cylinder in known fashion, and having a crankshaft connected to the piston which is rotatable by the reciprocal movement of the piston within the cylinder. In this disclosure, the fuel injection into the combustion chamber is described with reference to crank angle degrees before or after top dead center (TDC) which represent the position of the crankshaft relative its position when the piston is at TDC. The piston is at TDC when it has reached the end of a compression stroke and is about to begin an expansion stroke, more specifically when the piston is closest to the cylinder head.

Referring to FIG. 1, internal combustion engine system 100 shows an illustrative embodiment of a direct-injection gaseous-fuelled engine that uses a pilot fuel, for example diesel fuel, to assist in igniting the gaseous fuel injected into a combustion chamber. Internal combustion engine system 100 generally comprises engine 110, diesel fuel delivery subsystem 112, gaseous fuel delivery subsystem 114, and controller 116. The engine system further comprises air intake line 118 and exhaust gas line 120. Some of the exhaust gas exiting the engine in direction 122 is directed through exhaust gas recirculation loop 124 in direction 126 and through valve 128 into air intake line 118 where it is mixed with intake air flowing through air intake line 118. The mix of fresh intake air and recirculated exhaust gas is delivered to the intake ports of engine 110 in the direction shown by arrow 130. The exhaust gas exiting engine 110, which is not recirculated, flows in direction shown by arrow 132 through turbocharger 138 and on to line 134 which is connected to exhaust gas after-treatment subsystem 140 and from there the exhaust gas is released into the atmosphere through tailpipe 150. Turbocharger 138 preferably has a variable geometry, as known to persons familiar with the technology involved here, but the disclosed method can also be applied to engines without a turbocharger.

Exhaust gas after-treatment subsystem 140 comprises selective catalytic reduction (SCR) converter 142 and urea injection system 144. Exhaust gas after-treatment subsystem 140 can also comprise particulate filter 146 (known as a "DPF") and diesel fuel injector 148. DPF 146 can comprise a diesel oxidation catalyst device 149 for oxidizing the hydrocarbons and carbon monoxide within the exhaust gas.

Controller 116 can be integrated into a vehicle controller or it can be a separate controller that communicates with the vehicle controller. Controller 116 controls diesel fuel injection delivery subsystem 112, gaseous fuel delivery subsystem 114 and exhaust gas after-treatment subsystem 140 based on the detected engine operation state. Controller 116 receives information about at least one engine parameter indicative of the engine operation state, such as the engine speed and total fuelling amount. Based on the engine maps stored in its memory, controller 116 can determine when the engine is idling as further explained below in relation to FIGS. 4 and 5.

Figure 2:
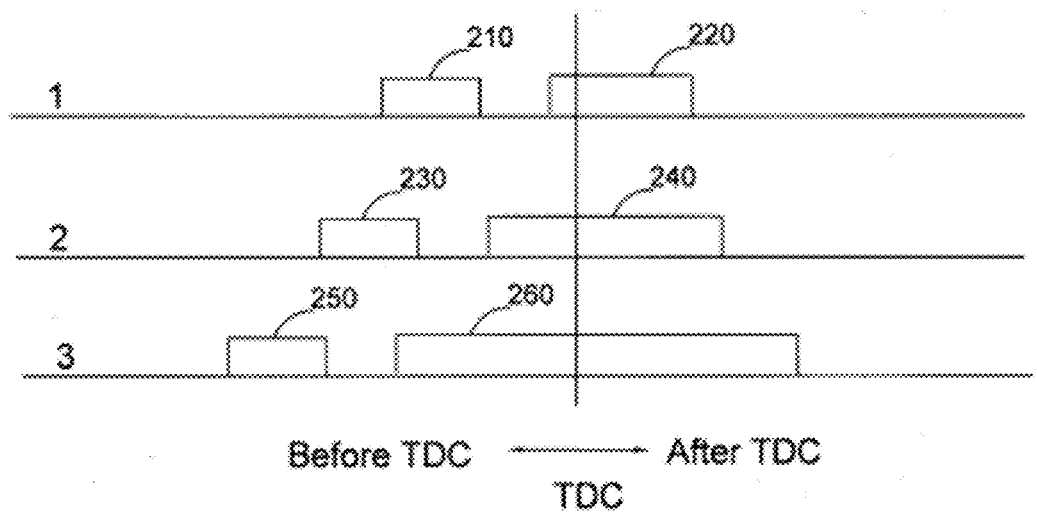
FIG. 2 is a schematic representation of the fuel injection timings for a gaseous-fuelled internal combustion engine when the engine is operating at idle, mid speed or higher speeds according to a conventional method of fuel injection control known in the prior art.

FIG. 2 illustrates a schematic representation of the fuel injection timings for a direct-injection gaseous-fuelled internal combustion engine similar to the one illustrated in FIG. 1, when the engine is operating at idle (1), mid-speed (2) or higher speeds (3). The approach to timing the start of injection is adapted from the known approach used for injecting diesel into diesel-fuelled engines, except that instead of injecting just diesel fuel, an initial pulse of diesel pilot fuel is injected followed by a larger pulse of gaseous fuel. Herein "idle" is used to refer to the state of an engine operating at low speeds (typically around 700 rpm for compression ignition engines, but idle speed can vary depending upon engine design) when the only load served by the engine is generated by friction and parasitic loads. When the engine operates at idle (1) controller 116 controls fuel delivery subsystems 112 and 114 to inject a quantity of diesel fuel 210 directly into the combustion chamber of the engine before top dead center and to inject a quantity of gaseous fuel 220 directly into the combustion chamber shortly after the diesel fuel injection and near top dead center. The timing for injecting the fuel and the fuel quantity is optimized to maintain a predetermined engine idling speed when no productive loads are served by the engine and the only load is generated by friction and parasitic loads. During the engine's mid-speed operation (2), when the engine speed increases compared to when the engine operates at idle, the timing of diesel fuel injection 230 and of gaseous fuel injection 240 occur earlier in the engine cycle relative to the top dead center when compared to the timing of fuel injection at idle. When the engine speed increases further to higher speeds, as shown in example (3) of FIG. 2, the timing of diesel fuel injection 250 and of gaseous fuel injection 260 occurs even earlier in the engine cycle relative to the top dead center.

In the prior art method described above, like with diesel-fuelled engines, in all operation modes diesel fuel is injected before top dead center and the start of the gaseous fuel injection generally occurs near or before top dead center. As engine speed increases, the start of diesel fuel injection and of gaseous fuel injection occurs earlier in the engine cycle. For example, for a 15 liter direct-injection gaseous-fuelled engine using diesel pilot ignition, the earliest timing of diesel fuel injection can be between 10 to 20 degrees crank angle before TDC when the engine operates at high speeds. In the prior art method illustrated in FIG. 2, diesel fuel is injected into the combustion chamber near the start of the gaseous fuel injection so that when the diesel pilot fuel ignites, it generates enough heat for heating the combustion chamber and effectively igniting the gaseous fuel that is introduced into the combustion chamber sequentially after the pilot fuel.

When an igniter is employed, such as, for example, a glow plug or other hot surface, or a spark plug, a pilot fuel is not needed. Nevertheless, in some embodiments the same fuelling strategy can be used if the igniter is employed to ignite a pilot quantity of gaseous fuel which in turn ignites the main quantity of gaseous fuel injected in respective pulses 220, 240 and 260.

Figure 3:
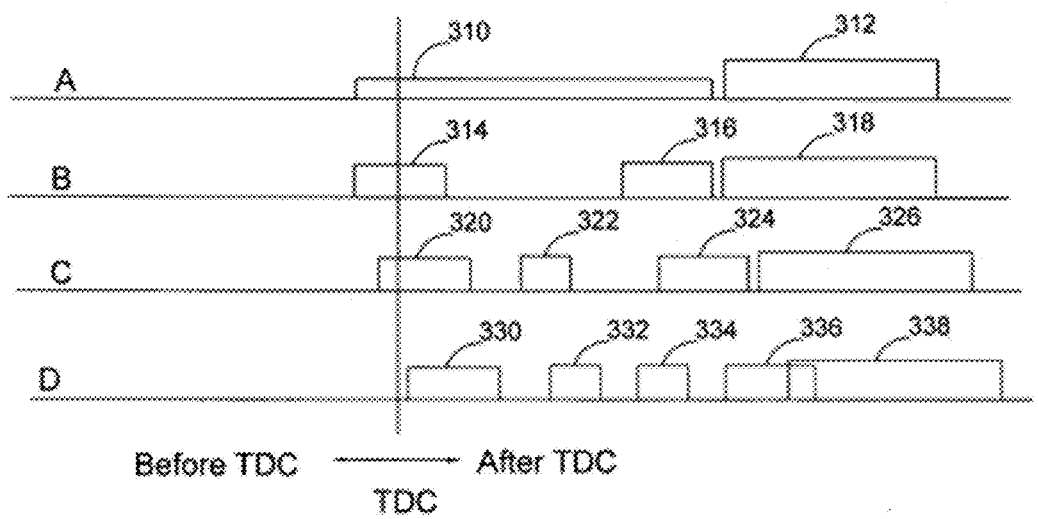
FIG. 3 is a schematic representation of the fuel injection timings when the engine operates at idle according to the present method whereby the exhaust gas temperature is increased and maintained at the required temperature for improving NOx conversion rates in the SCR converter.

The presently disclosed improved method of controlling fuel injection when the engine operates at idle is illustrated in FIG. 3 which shows the fuel injection timings for four different embodiments A to D, all relating to fuel injection strategies for when a gaseous-fuelled direct-injection internal combustion engine is idling. Based on the embodiments illustrated in FIG. 3 and described in more detail below, the present method can be implemented on a gaseous-fuelled internal combustion engine that employs a pilot fuel such as diesel for assisting ignition or engines that employ other means of assisting ignition, such as, for example a glow plug or another hot surface, or a spark plug. In such cases gaseous fuel pulses can replace diesel pulses in the injections described below while still following the injection patterns illustrated in embodiments A through D of FIG. 3.

In the embodiments of the presently disclosed method, gaseous fuel injection starts later in the engine cycle compared to the gaseous fuel injection timing practiced in the prior art conventional methods that followed conventional approaches employed by diesel-fuelled engines, as illustrated in FIG. 2. By delaying the injection of the gaseous fuel, more heat is transferred to the exhaust gas exiting the combustion chamber and this heat is carried into the SCR catalyst bed, helping to maintain it at a higher temperature when the engine is idling. In embodiments in which a pilot fuel is employed as the means for assisting ignition, because of the relatively low energy requirements for sustaining the engine speed when idling, most of the energy needed to sustain idling is provided by the combustion of the pilot fuel, and much of the energy from burning the gaseous fuel is converted into heat. In embodiment A of the presently disclosed method the timing for injecting first quantity of fuel 310 directly into the combustion chamber is set to begin when the piston is near top dead center, and the combustion of this fuel contributes mostly to overcoming friction and parasitic loads to sustain engine idling speed. The injection of first quantity of fuel 310 can end near the timing for beginning gaseous fuel injection 312. Gaseous fuel is injected directly into the combustion chamber and gaseous fuel injection 312 begins sequentially after the timing of the injection of the first quantity of fuel 310 and after top dead center. With this approach, the timing for the combustion of the gaseous fuel is adjusted to increase the exhaust gas temperature to at least 200 degrees Celsius, which maintains the temperature inside SCR converter 142 at an operating range that improves NOx conversion efficiency. That is, the temperature of the exhaust gas exiting the combustion chamber is increased by increasing a delay in timing for beginning injection of gaseous fuel injection 312, but unlike with conventional diesel engines, for gaseous-fuelled engines the length of this delay is limited to keep concentration of unburned fuel exiting the combustion chamber below a predetermined concentration, generally below 1000 ppm and, in preferred embodiments, below a concentration of between 200 and 300 ppm.

In preferred embodiments, injection of first quantity of fuel 310 ends within 1 degree crank angle before or after of timing for beginning gaseous fuel injection 312 so that diesel fuel can effectively ignite the gas. Injection of first quantity of fuel can begin when the crankshaft is positioned between about 2 crank angle degrees before TDC and about 5 crank angle degrees after TDC.

When an engine is idling, and diesel fuel is employed as a pilot to ignite the gaseous fuel, diesel fuel is injected as the first quantity of fuel 310 and the combustion of the diesel fuel injected near TDC does most of the work to overcome friction and parasitic loads to sustain a predetermined engine idling speed and the combustion of the portion of diesel fuel injected near the beginning of gaseous fuel injection 312 helps to promote ignition of the gaseous fuel. In this method any fuel that auto-ignites within the combustion chamber can be injected as the first quantity of fuel 310. Such a fuel can be selected from the group consisting of dimethylether, bio-diesel and kerosene. Even though diesel fuel is referred to herein as a pilot fuel, the diesel fuel injected as the first quantity of fuel 310 serves both for igniting the gaseous fuel and for sustaining a predetermined engine idling speed as explained above.

When the engine uses an igniter other than a pilot fuel, to promote ignition of the gaseous fuel, such as a glow plug or other hot surface, or a spark plug, the first quantity of fuel 310, can be the gaseous fuel and the gaseous fuel injected near top dead center is combusted to do work and overcome friction and any parasitic loads, and thereby sustain a predetermined engine idling speed. The gaseous fuel injected in the later portion of the first quantity of fuel 310 burns to help ignite gaseous fuel injection 312.

With reference still to FIG. 3, in embodiment B of the presently disclosed method, the injection of the first quantity of fuel is divided into two pulses such that a first pulse 314 is injected into the combustion chamber near top dead center and second fuel pulse 316 is injected into the combustion chamber near the start of gaseous fuel injection 318. In this embodiment the injection of first pulse 314 can start at a crank angle of between 2 degrees before TDC and 5 degrees after TDC. Gaseous fuel injection 318 starts later in the engine cycle at a crank angle determined through experimental tests to increase the temperature of the exhaust gas to the operating temperature range for the SCR converter, generally above 200 degrees Celsius. Higher temperatures in the SCR converter are generally associated with higher conversion efficiencies and like in all embodiments, longer delays in the timing for beginning gaseous fuel injection 318 result in higher temperatures for the exhaust gas exiting the combustion chamber and with the disclosed method temperatures higher than 200 degrees Celsius can be achieved as long as the delay is not so long as to result in the unburned fuel concentration in the exhaust gas exceeding a predetermined level, generally, 1000 ppm, or in preferred embodiments 200 ppm or 300 ppm.

Combustion of first fuel pulse 314 serves to overcome friction and satisfy parasitic loads to sustain a predetermined engine idling speed and combustion of second fuel pulse 316, injected near the beginning of gaseous fuel injection 318, contributes to the ignition of gaseous fuel injection 318. The end of second pulse 316 generally occurs within 1-degree crank angle before or after the beginning of fuel injection 318 such that the ignition of fuel injected in pulse 316 can effectively heat the combustion chamber and contribute to the gaseous fuel ignition.

In alternate embodiments C and D of the presently disclosed method, injection of the first quantity of fuel is divided into a plurality of pulses, by injecting respective first pulses 320 and 330, into the combustion chamber near TDC, followed by one or more respective pulses 322, 332 and 334, as shown in FIG. 3, injected sequentially into the combustion chamber before a last respective fuel pulse 324 and 336, which is injected into the combustion chamber shortly before respective gaseous fuel injections 326 and 338, so that the end of respective pulses 324 and 336, is near the start of respective gaseous fuel injections 326 and 338. The end of respective last pulses 324 and 336 generally occurs within 1-degree crank angle before or after the start of respective gaseous fuel injection 326 and 338, as illustrated in FIG. 3. Pulses 320, 322 and 324 and respectively 330, 332, 334 and 336 can each be of the same duration or can vary in duration. The preferred duration of each pulse and the separation time between these pulses can depend upon the size of engine, the type of fuel used and the engine's desired operating characteristics, but these parameters can be determined empirically by known calibration methods. Once an engine has been calibrated, the calibrated parameters can be entered into look up tables or multi-dimensional maps which are then stored in the memory of controller 116 to be used for controlling the fuel injection strategy for all engines made with the same design.

The quantity of fuel injected in first injection 310 and in second injection 312 in embodiment A are each controllable by controller 116 in response to the engine speed or any existent load communicated from the vehicle controller. Similarly, when a plurality of pulses are injected into the combustion chamber as described in embodiments B, C or D of the present method, the quantity of fuel injected into the combustion chamber in the first pulse (for example, pulse 314, 320 or 330) and the quantity of gaseous fuel (injected for example in injections 318, 326 and 338) are controllable by controller 116 in response to the engine speed or any current engine load communicated directly to controller 116 or indirectly through a vehicle controller. Such variations of engine speed and load are generally minimal due to the fact that during idling the engine speed stays low, around 700 ppm, and the engine load is negligible considering that the engine only needs to overcome friction and parasitic loads, which are generally very small relative to the engine's maximum load output.

When gaseous-fuelled internal combustion engine systems comprising a SCR converter, as illustrated in FIG. 1, operate at idle according to the prior art method illustrated in FIG. 2, the temperature of the exhaust gas is not high enough to maintain the SCR catalyst bed temperature above 200 degrees Celsius which results in a reduced conversion efficiency for the SCR converter. The presently disclosed method illustrated in FIG. 3 differs from the conventional method of fuel injection used for diesel and direct-injection gaseous-fuelled internal combustion engines at idle in that the start of fuel injection occurs later in the engine cycle. More specifically the injection of the first quantity of fuel starts near top dead center and the injection of gaseous fuel starts after top dead center, when the piston is on its expansion stroke within the cylinder. The first quantity of fuel can be a fuel that reliably auto-ignites, such as diesel fuel or it can be the gaseous fuel, if the engine is equipped with an igniter in the combustion chamber to assist with ignition of the gaseous fuel. For example, the igniter can be a glow plug or other hot surface device, or a spark plug. By delaying injection of fuel compared to prior art gaseous-fuelled engines, the late combustion of the gaseous fuel generates less work on the piston and results in more heat being transferred to the exhaust gas stream. Some of the heat in the exhaust gases is transferred to the SCR converter in the after-treatment system and this helps to keep the temperature of the SCR catalyst bed above a predetermined temperature that results in more efficient NOx conversion rates; this predetermined temperature can vary depending upon the catalyst composition, but using known catalyst compositions this predetermined temperature has been found to be generally around 200 degrees Celsius.

It is important to note that gaseous-fuelled engines and conventional diesel-fuelled engines, which are not fuelled with any gaseous fuel, have distinct differences, which prevent methods used by conventional diesel-fuelled engines from being directly applied to gaseous-fuelled engines. With a conventional diesel engine, the unburned diesel fuel exiting the combustion chamber which reaches the after-treatment subsystem is oxidized on the oxidation catalysts of the exhaust gas after-treatment subsystem generating heat which further increases the temperature of the exhaust gas. Accordingly, the presence of excessive unburned diesel fuel in the exhaust gas exiting the combustion chamber does not result in any adverse effect on the aftertreatment subsystem and can even be beneficial by raising the temperature in the aftertreatment subsystem. This is different from gaseous-fuelled engines, where unburned fuel which consists mainly of lighter hydrocarbons such as methane, which does not oxidize easily on the after-treatment catalysts especially at lower temperatures is being released unburned into the atmosphere through the tailpipe without generating heat to raise the temperature in the aftertreatment subsystem. Therefore, in a gaseous-fuelled internal combustion engine system it is preferable to avoid expelling unburned fuel from the combustion chamber. The presently disclosed method teaches delaying the injection of gaseous fuel to begin later in the expansion stroke, while limiting this delay in order to combust substantially all of the gaseous fuel within the combustion chamber. The timing for beginning injection of the gaseous fuel can be determined empirically by known engine calibration methods, and can depend on various factors such as the engine size and type of fuel. Such calibration methods were used with a Westport GX 15 liter engine fuelled with natural gas to produce experimental data that showed that a preferred timing for the gaseous-fuel injection occurs after the injection of a diesel pilot fuel, when the crankshaft is at a crank angle between 14 and 25 degrees after TDC.

The presently disclosed method of controlling fuel injection timing to maintain the SCR catalyst bed temperature above 200 degrees Celsius can be complemented by a preferred air handling strategy. Referring once again to the embodiment shown in FIG. 1, when controller 116 controls valve 128 and turbocharger 138 to reduce the cross-section through which the exhaust gas flows, the result is a reduction in the turbocharger efficiency which causes an increase of the pumping work of the engine to maintain a desired power. To generate more pumping work, the fuelling amount supplied to the engine has to increase. As a consequence, more fuel is combusted within the combustion chamber generating more heat which is partially transferred to the exhaust gas exiting the combustion chamber and thereby increasing its temperature which is in turn transferred to the catalyst bed in the after-treatment subsystem.

Figure 4:
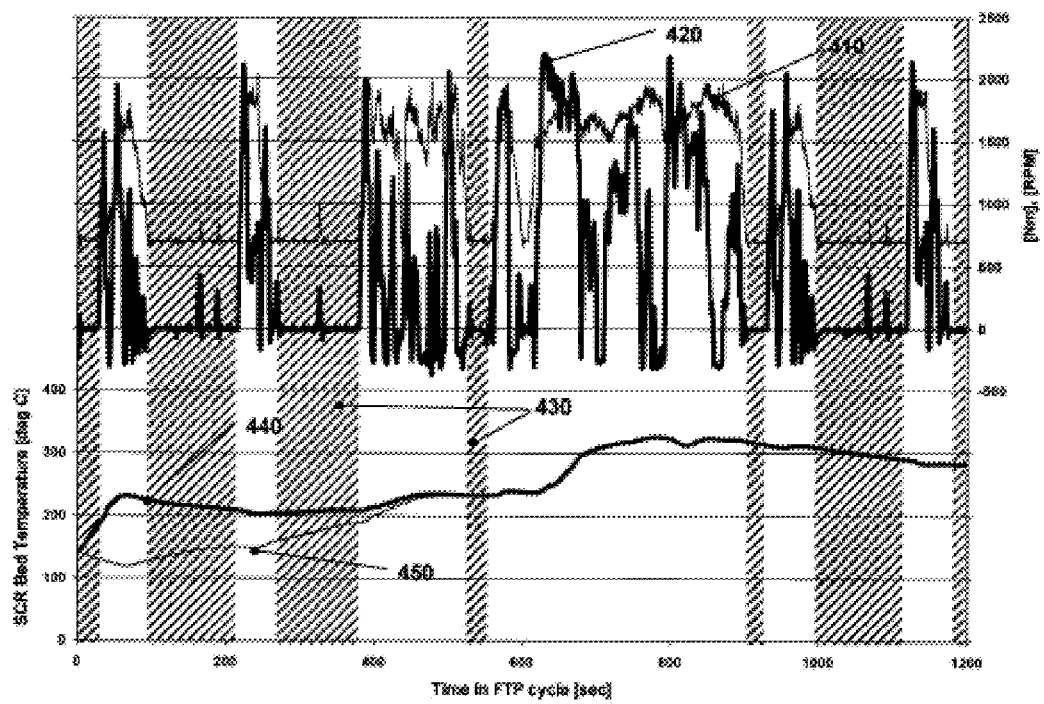
FIG. 4 is an illustration of the fuel injection timing zones for an engine test cycle when the present fuel injection control strategy was applied and it also illustrates the SCR catalyst bed temperature recorded during testing.

A Westport GX 15 liter engine fuelled with natural gas was employed to validate the disclosed method and to compare the engine's emissions against government regulations. FIG. 4 shows a plot of the engine speed shown by line 410 and torque output shown by line 420. The hatched areas show when the engine was idling. The presently disclosed method was applied in zones 430, when engine speed 410 and torque output 420 had low values.

To demonstrate the effect of the presently disclosed method on the SCR catalyst bed temperature, line 440 is plotted beneath the engine speed and torque curves. Line 440 is a plot of the SCR catalyst bed temperature during the engine test corresponding to the torque and speed curves, when the presently disclosed injection strategy was implemented in zones 430. Line 440 shows that a short time after the beginning of the test (around 25 seconds) the SCR bed temperature rose to a temperature above 200 degrees Celsius, and after this initial rise in the SCR bed temperature, the temperature was maintained above 200 degrees Celsius for the entire test, including during the subsequent times when the engine was operating at idle (zones 430). Line 450 is a plot of the SCR catalyst bed temperature during a test performed under the same conditions on the same engine when the conventional method of fuel injection illustrated in FIG. 2 was applied, showing that the SCR catalyst bed remained at a significantly lower temperature for an extended time, which resulted in significantly higher levels of NOx in the tailpipe emissions.

Figure 5:
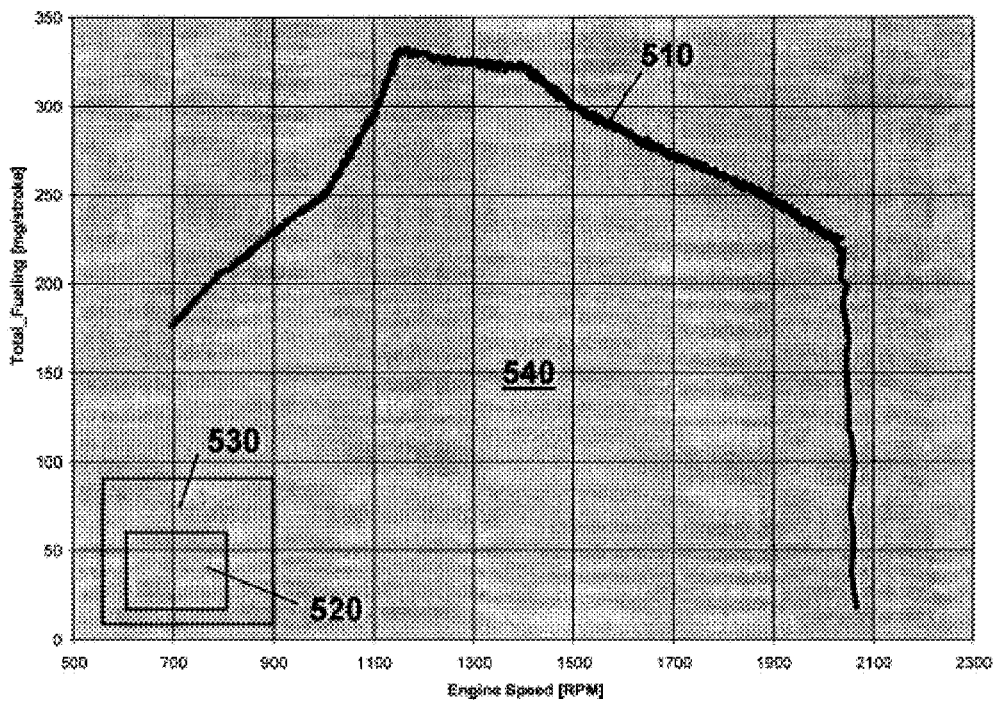
FIG. 5 is an illustration of the engine's speed-fuelling map that shows the range of engine speed and total fuelling amount where the present fuel injection strategy can be applied.

FIG. 5 illustrates a speed-fuelling map for a Westport GX 15 liter gaseous-fuelled direct injection engine where the full load fuelling curve is identified by reference numeral 510. This map also shows a zone 520 that represents the zone on the map where the engine is considered to operate at idle and where the presently disclosed method of fuel injection control could be used. The predetermined range of engine speed and total fuelling amount of zone 520 where the engine is considered to operate at "idle" can vary from one engine to another depending on the engine size and type. Generally most engines are considered to operate at "idle" when the engine speed is around 700 rpm and the values of total fuelling are in a range at the lowest end of the scale on the map. When the engine is idling the load on the engine is mainly caused by friction and parasitic loads. Examples of parasitic loads include, belt driven auxiliary equipment such as fuel pumps, pumps for engine cooling systems and hydraulic systems, alternators for producing electrical energy, air conditioning, and refrigeration units.

Another zone on the map is zone 540 where the engine is operating at load. For a truck engine, zone 540 represents the load when the engine is working to propel the truck. In zone 540 on the map fuel injection into the combustion chamber can be controlled according to conventional methods known in the prior art and illustrated in the examples of mid-range speed (2) and higher speed (3) in FIG. 2. This is because at higher loads, when more fuel is being combusted, with the fuelling methods shown in embodiments (2) and (3) in FIG. 2, the temperature of the exhaust gas exiting the combustion chamber is above 200 degrees Celsius without needing to delay combustion of the gaseous fuel to elevate exhaust gas temperatures.

For an engine used to power a vehicle, a speed-fuelling map as the one illustrated in FIG. 5 can be stored in the vehicle controller's memory. The vehicle controller monitors the engine speed and other parameters indicative of the engine condition, as for example the total fuelling amount, and communicates the values of these parameters to controller 116 which controls the fuel injection into the combustion chamber. When the detected engine speed and total fuelling amount is within zone 520 on the map, controller 116 controls the fuel injection according to the present method. When transitioning from engine idle zone 520 to load zone 540, more specifically when the engine speed and the total fuelling amount are within the boundaries of zone 530, the engine operates in a transition mode described below.

If at idle fuel injection is controlled according to embodiment A shown in FIG. 3, during the transition mode the method comprises gradually advancing the timing for beginning injection of first quantity of fuel 310 and the timing for beginning injection of gaseous fuel 312 until each begins when the crankshaft reaches a crank angle before top dead center which is determined based on the engine speed according to a conventional method characteristic to the engine operation at load. The method further comprises over the same period of time, controlling the quantity of fuel injected into the combustion chamber during injection of first quantity of fuel 310 and during injection of gaseous fuel 312 until the quantity of fuel injected in each injection is commanded based on the engine load according to a conventional method characteristic to the engine operation at load. The transitioning from the present method to an injection control strategy similar to those presented in FIG. 2, examples (2) and (3) can be done over a predetermined period of time. In other embodiments the engine can operate in the transition mode for as long as the commanded total fuelling amount and engine speed are within zone 530 on the speed-fuelling map.

If at idle fuel injection is controlled according to embodiment B shown in FIG. 3 and controller 116 determines that the engine has transitioned from idling to load, more specifically when the engine starts to operate in zone 530 on the speed-fuelling map, the amount of fuel injected in second pulse 316 and the separation time between the end of first pulse 314 and fuel injection 318 are gradually decreased until the amount of fuel injected in the second pulse 316 is close to zero, and the separation time between first fuel pulse 314 and fuel injection 318 reaches a value that corresponds to the separation time between the first fuel injection and the second fuel injection determined according to a conventional method of controlling the fuel injection at load. Over the same period of time, controller 116 gradually advances the timing of first pulse 314, second pulse 316 and of fuel injection 318 to promote a smooth transition to zone 540. The transitioning from the present method to an injection control strategy similar to those presented in FIG. 2, examples (2) and (3) can be done over a predetermined period of time. In other embodiments the engine can operate in the transition mode for as long as the commanded total fuelling amount and engine speed are within zone 530 on the speed-fuelling map.

Similarly, if at idle fuel injection is controlled according to embodiment C or D shown in FIG. 3 and controller 116 determines that the engine has transitioned from idling to load, more specifically when the engine starts to operate in zone 530 on the speed-fuelling map, the timing for beginning injection of each fuel pulse injected into the combustion chamber, for example, pulses 320, 322 and 324 and, respectively 330, 332, 334 and 336 and the timing for beginning injection of gaseous fuel 326, and respectively 338, are gradually advanced to an earlier timing in the engine cycle which corresponds to the fuel injection timing determined according to a conventional method of controlling fuel injection at load. Over the same period of time controller 116 controls the fuel injector to gradually decrease the number of pulses and the amount of fuel injected in fuel pulses 322 and 324 and respectively in fuel pulses 332, 334 and 336 while decreasing the separation time between the end of first fuel pulse 320 and the start of fuel injection 326 and respectively between the end of first fuel pulse 330 and gaseous fuel injection 338 until a single first pulse is injected into the combustion chamber before and near the beginning of the gaseous fuel injection and the quantities of fuel injected in the first injection and in the gaseous fuel injection have the values that correspond to the quantities of fuel determined according to a conventional method of controlling fuel injection at load. The transitioning from the present method to an injection control strategy similar to those presented in FIG. 2, examples (2) and (3) can be done over a predetermined period of time. In other embodiments the engine can operate in the transition mode for as long as the commanded total fuelling amount and engine speed are within zone 530 on the speed-fuelling map.

As described above it is in this transition zone 530 illustrated on the speed-fuelling map that the injection control strategy changes from the present method to an injection control strategy similar to those presented in FIG. 2, examples (2) and (3).

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A method of controlling a gaseous-fuelled internal combustion engine system comprising an internal combustion engine and a selective catalyst reduction (SCR) converter, said internal combustion engine comprising a combustion chamber defined by a cylinder and a piston reciprocable within said cylinder, said piston being connected to a crankshaft that rotates when said piston reciprocates, and an injector for injecting a gaseous fuel directly into said combustion chamber, wherein an exhaust gas exiting from said combustion chamber is received in said selective catalyst reduction (SCR) converter that is operative to reduce levels of NOx in said exhaust gas by converting NOx into nitrogen and water, said method comprising:
　(A) detecting at least one engine parameter indicative of when said internal combustion engine is idling; and
　(B) in an engine cycle, during said internal combustion engine's idling time:
　　(i) beginning injection of a first quantity of fuel when said piston is near top dead center; and
　　(ii) controlling temperature of exhaust gas exiting said combustion chamber to be above a predetermined temperature that is defined by an operating temperature range that achieves a desired conversion efficiency for said selective catalytic reduction converter, by:
　　　(a) beginning injection of said gaseous fuel after said beginning injection of said first quantity of fuel, and
　　　(b) increasing exhaust gas temperature by increasing a delay in timing for injecting said gaseous fuel, while limiting said delay to keep concentration of unburned said gaseous fuel exiting said combustion chamber below a predetermined concentration, wherein said delay in timing, measured in degrees of crank angle rotation, is between 14 and 25 degrees after top dead center.

2. The method of claim 1 further comprising injecting said first quantity of fuel in a plurality of pulses introduced sequentially into said combustion chamber.

3. The method of claim 2 wherein each one of said pulses has the same duration.

4. The method of claim 1 wherein one parameter indicative of when said engine is idling is said engine's speed.

5. The method of claim 1 wherein one parameter indicative of when said engine is idling is a total fuelling amount.

6. The method of claim 1 further comprising, during a transition time of said engine from idling to load, gradually advancing both timing for beginning injection of said first quantity of fuel and timing for beginning injection of said gaseous fuel until each begins before said piston is at top dead center with each timing predetermined based on engine speed and respective commanded quantities of fuel based on total fuel energy required by engine load.

7. The method of claim 2 further comprising, during a transition time of said engine from idling to load, gradually advancing both timing for beginning injection of each one of said plurality of pulses and timing for beginning injection of said gaseous fuel, and decreasing elapsed time between said plurality of pulses, until said plurality of pulses has merged into a single pulse and timing for beginning injection of said first quantity of fuel and said gaseous fuel is before said piston is at top dead center with each timing predetermined based on engine speed and respective commanded quantities of fuel based on total fuel energy required by engine load.

8. The method of claim 1 wherein said predetermined concentration of unburned gaseous fuel exiting said combustion chamber is less than or equal to 1000 ppm.

9. The method of claim 1 wherein said predetermined temperature of said exhaust gas exiting said combustion chamber is equal to or higher than 200 degrees Celsius.

10. The method of claim 1 further comprising ending injection of said first quantity of fuel at a timing when said crankshaft angle of rotation is within 1 degree before or after beginning said injection of said gaseous fuel.

11. The method of claim 1 further comprising beginning said injection of said first quantity of fuel when said crankshaft is positioned between 2 crank angle degrees before top dead center and 5 crank angle degrees after top dead center.

12. The method of claim 1 wherein said gaseous fuel is selected from the group consisting of natural gas, methane, propane, butane, hydrogen, and mixtures thereof.

13. The method of claim 1 wherein for internal combustion engines comprising an igniter disposed within said combustion chamber for igniting said fuel, said first quantity of fuel is a fuel that is the same as said gaseous fuel.

14. The method of claim 1 wherein said first quantity of fuel is a fuel that auto-ignites in said combustion chamber.

15. The method of claim 14 wherein said first quantity of fuel is selected from the group consisting of diesel fuel, dimethylether, bio-diesel, and kerosene.

16. A method of controlling a gaseous-fuelled internal combustion engine system comprising an internal combustion engine and a selective catalyst reduction (SCR) converter, said internal combustion engine comprising a combustion chamber defined by a cylinder and a piston reciprocable within said cylinder, said piston being connected to a crankshaft that rotates when said piston reciprocates, and an injector for injecting a gaseous fuel directly into the combustion chamber, wherein an exhaust gas exiting from said combustion chamber is received in said selective catalyst reduction (SCR) converter that is operative to reduce levels of NOx in said exhaust gas by converting NOx into nitrogen and water, said method comprising:
(A) detecting said engine's speed and total fuelling amount;
(B) during an idling time of said engine determined from said engine speed and total fuelling amount:
  (i) beginning injection of a first quantity of fuel injected directly into said combustion chamber in two pulses, beginning injection of a first pulse when said piston is near top dead center and beginning injection of a second pulse after ending said injection of said first pulse,
  (ii) controlling temperature of exhaust gas exiting said combustion chamber to be above a predetermined temperature that is defined by an operating temperature range that achieves a desired conversion efficiency for said selective catalytic reduction converter by:
    (a) beginning injection of said gaseous fuel directly into the combustion chamber after beginning injection of said two pulses, and
    (b) increasing exhaust gas temperature by increasing a delay in timing for injecting said gaseous fuel, while limiting said delay to keep concentration of unburned said gaseous fuel exiting said combustion chamber below a predetermined concentration, wherein beginning injection of said second pulse is adjusted to be near beginning injection of said gaseous fuel, and wherein said delay in timing, measured in degrees of crank angle rotation, is between 14 and 25 degrees after top dead center.

17. The method of claim 16 wherein said predetermined concentration of unburned gaseous fuel exiting said combustion chamber is less than or equal to 1000 ppm.

18. The method of claim 16 wherein said predetermined temperature of said exhaust gas exiting said combustion chamber is equal to or higher than 200 degrees Celsius.

19. The method of claim 16 further comprising ending injection of said first quantity of fuel at a timing when said crankshaft angle of rotation is within 1 degree before or after beginning said injection of said gaseous fuel.

20. The method of claim 16 further comprising beginning said injection of said first quantity of fuel when said crankshaft is positioned between 2 crank angle degrees before top dead center and 5 crank angle degrees after top dead center.

21. The method of claim 16 wherein each one of said pulses has the same duration.

22. The method of claim 16 wherein said gaseous fuel is selected from the group consisting of natural gas, methane, propane, butane, hydrogen, and mixtures thereof.

23. The method of claim 16 wherein for internal combustion engines comprising an igniter disposed within said combustion chamber for igniting said fuel, said first quantity of fuel is a fuel that is the same as said gaseous fuel.

24. The method of claim 16 wherein said first quantity of fuel is a fuel that auto-ignites in said combustion chamber.

25. The method of claim 24 wherein said first quantity of fuel is selected from the group consisting of diesel fuel, dimethylether, bio-diesel, and kerosene.

26. The method of claim 16 further comprising, when determining from said engine speed and total fuelling amount that said engine has transitioned from idling to load, gradually advancing both timing for beginning injection of each one of two pulses and timing for beginning injection of said gaseous fuel, decreasing elapsed time between the end of said first pulse and the beginning of said gaseous fuel injection and decreasing the amount of fuel injected in said second pulse, until a single pulse is injected into the combustion chamber and timing for beginning injection of said single pulse and said gaseous fuel is before said piston is at top dead center with each timing predetermined on engine speed and respective commanded quantities of fuel based on total fuel energy required by engine load.

27. A combustion control system of a gaseous-fuelled internal combustion engine system comprising:
an internal combustion engine comprising a combustion chamber defined by a cylinder, and a piston reciprocable within said cylinder, said piston being connected to a crankshaft that rotates when said piston reciprocates, and an injector for injecting a gaseous fuel directly into said combustion chamber;
a gaseous fuel delivery subsystem;
a selective catalyst reduction (SCR) converter in an exhaust passage that is operative to reduce levels of NOx in said exhaust gas by converting NOx into nitrogen and water, wherein an exhaust gas exiting from said combustion chamber is received in said selective catalyst reduction (SCR) converter that is operative to reduce levels of NOx in said exhaust gas by converting NOx into nitrogen and water;
a controller configured to be electronically connected to said injector for injecting a gaseous fuel directly into said engine combustion chamber; the controller being programmed to perform the following:
(A) detect at least one engine parameter indicative of when said internal combustion engine is idling; and
(B) in an engine cycle, during said internal combustion engine's idling time:
  (i) actuate an injector at a timing of an injection of a first quantity of fuel to begin when said piston is near top dead center;
  (ii) actuate an injector at a timing of an injection of said gaseous fuel to be after timing for injecting said first quantity of fuel, and
  (iii) increase a delay in timing for injecting said gaseous fuel to increase exhaust gas temperature, while limiting said delay to keep concentration of unburned said gaseous fuel exiting said combustion chamber below a predetermined concentration to control temperature of exhaust gas exiting said combustion chamber to be above a predetermined temperature that is defined by an operating temperature range that achieves a desired conversion efficiency for said selective catalytic reduction converter; wherein said delay in timing, measured in degrees of crank angle rotation, is between 14 and 25 degrees after top dead center.

28. The combustion control system of claim 27 wherein said first quantity of fuel is a plurality of pulses introduced sequentially into said combustion chamber and ending injection of said first quantity of fuel is at a timing when said crankshaft angle of rotation is within 1 degree before or after beginning said injection of said gaseous fuel.

* * * * *